ALBERT F. ROBERTS.
Improvement in Corn Harvesters.
No. 119,181. Patented Sep. 19, 1871.
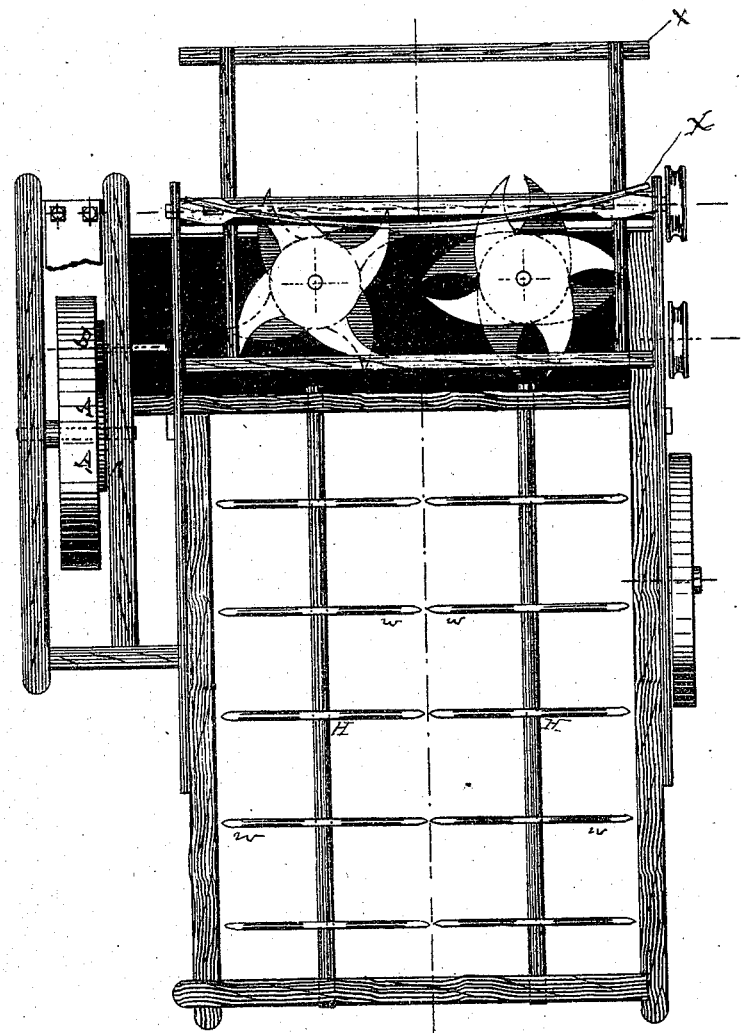
FIG. I.
WITNESSES:
Geo. H. Howard
John C. Cox
INVENTOR:
Albert F. Roberts
By his attys.
Cox and Cox

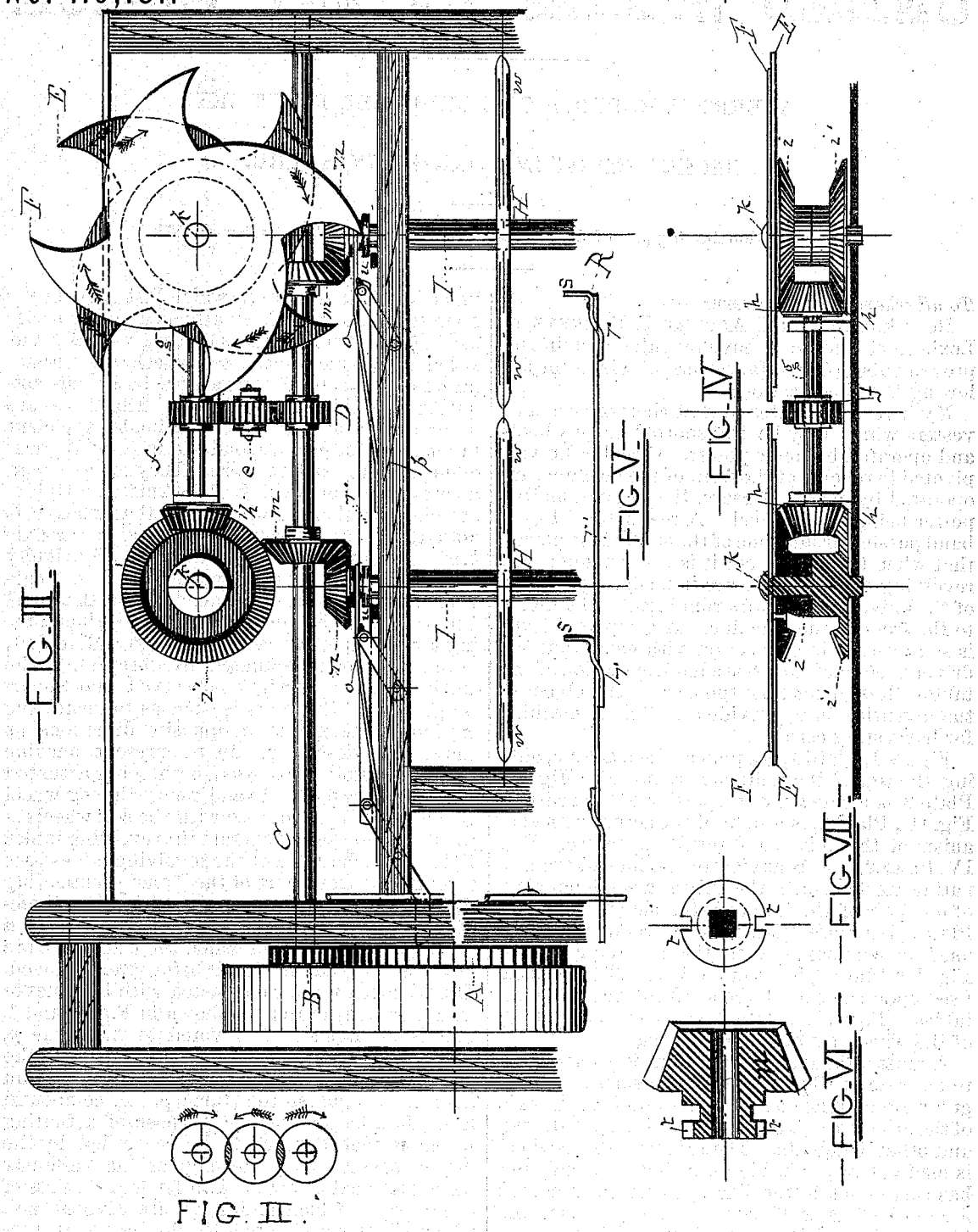

UNITED STATES PATENT OFFICE.

ALBERT F. ROBERTS OF LEXINGTON, KENTUCKY.

IMPROVEMENT IN CORN-HARVESTERS.

Specification forming part of Letters Patent No. 119,181, dated September 19, 1871.

*To all whom it may concern:*

Be it known that I, ALBERT F. ROBERTS, of Lexington, Kentucky, have invented certain Improvements in Corn-Harvesters, of which the following is a specification:

My invention relates to that class of corn-harvesters which may be transported upon wheels and operated by horse-power. Circular knives, pivoted to revolve at the front of the machine, are operated by means of gears, the original motive power being a cog-wheel. A reel actuated by a band passing around one of the shafts is so placed that when the corn is cut it is thrown upon two revolving tables which are immediately in rear of the knives, their shafts running at right angles to the front of the machine. A compound lever is so arranged in connection with gears that the driver is enabled to cause a half-revolution of the tables, thus depositing the corn. The object of the invention is to provide an efficient machine for harvesting corn.

Figure I, Plate 1, is a plan of the machine, having the top of the knife-box removed. Fig. II, Plate 2, is a side view of a portion of the gearing. Fig. III, Plate 2, is a plan of the actuating mechanism of the knives and revolving tables. Fig. IV, Plate 2, is a front view of the immediate actuating mechanism of the knives, a sectional view of one pair of the knives being shown. Fig. V, Plate 2, is a representation of the compound lever used in connection with the revolving tables. Fig. VI, Plate 2, is a sectional view of the wheels used upon the end of the shafts of the revolving tables. Fig. VII, Plate 2, is a view of the base of the wheel last above mentioned.

A substantial rectangular frame is constructed, to one side of which is attached a smaller rectangular frame sufficiently strong to support the axle of the principal drive-wheel, the weight of a driver, and other incidents. The principal drive-wheel is made of any suitable form and material, and has cast or set in the side opposite the machine a cog-wheel, A, sufficiently large to insure the transmission of the necessary motion to other parts. Immediately in front of the principal cog-wheel is a smaller gear or cog-wheel, B, which is attached to a shaft, C, that extends across the machine, passing through the smaller frame and resting in the other side of the principal frame. In the center of this shaft is another cog-wheel, D, which is so made as to operate a cog-wheel, e, immediately in front of it, which last cog-wheel e operates a cog-wheel, f, attached to a smaller shaft, g, constructed with small cog-wheels h h at either end, which small cog-wheels h h actuate larger cog-wheels i i', that are the immediate actuating mechanism of the knives. The knives are of circular form, provided with blades sufficient in length to project beyond the front of the machine, so as to reach the corn. They revolve upon a vertical axle or pivot, k. The knife E is rigidly attached to the cog-wheel i, so that when it is actuated it turns freely upon the pivot or axle k, moving from left to right. The knife F is rigidly attached to the pivot or vertical axle k, a cog-wheel, i', being securely attached below the wheel i so as to turn the said pivot or axle k, thus causing a revolution of the knife F from right to left, both knives being actuated, as aforesaid, by the small wheel h. It will be observed that the arrangement of the gears is such as to insure the motion of the knives in opposite directions, as shown and described. In the present machine two sets of knives are used, both being actuated as above described. In addition to the cog-wheel D the shaft C is provided with the cog-wheels m m, which are used to operate the revolving tables H H. The shafts I I of the revolving tables pass through the front part of the frame p, extending the whole length of the machine, the ends thereof adjacent to the knives being constructed in a rectangular form, upon which the wheels n n are placed so as to admit of their being readily moved. The wheels n n are constructed with thimbles in which grooves are cut, as shown in Figs. 6 and 7. Simple springs o o are pivoted to the frame p, their ends being constructed so as to fit in the grooves in the thimbles of the wheels n n and hold them against the frame p. A compound lever, R, a handle for the purpose of actuating which is placed so as to be controlled by the driver, passes along the edge of the knife-box being attached thereto. This lever R consists of a bar, r', to which slides r r are pivoted, and which slides r r are provided at their ends with pins s s. The slides r r are pivoted so as to move freely and pass under the springs o o, so that when the lever is operated the effect is to press the said springs up against the wheels n n and to slide them in gear with the wheels m m. In the edges of the thimbles of the wheels n n, (see Fig. VII,) notches t t are cut on the opposite sides thereof, and pins *u u*, made so as to fit in these notches, are firmly attached or driven in the frame *p* at points immediately under the notches *t t*, so that they hold the revolving tables firmly in their normal positions until the wheels *n n* are thrown into gear with the wheels *m m*. When the lever is applied the wheels *n n* are freed from the pins *u u* and thrown in gear with the wheels *m m*, and the turning of the tables H H ensues. The lever may then be dropped and the edge of the thimbles of the wheels *n n* will rest upon the pins *u u*, the turning of the tables continuing until a half-revolution is performed, when the opposite notches coming over the pins the springs *o o* force the wheels *n n* out of gear and back against the frame *p*, the pins *u u* fitting in the notches and holding the tables in their original position. The revolving tables are constructed with arms *w w w*, or in any manner suitable to receive the corn when cut. Above the knives, attached in any suitable manner, a reel is placed, which, actuated by a band passing around the axle of the main wheel, or any of the other axles, operates in the usual manner, so as to throw the corn when cut upon the revolving tables. This reel is constructed with circular or curved wings *x x*, the effect of which is to throw the corn toward the center of the tables, thus facilitating the operation thereof. It may be found expedient to attach a balance-wheel to the main shaft, so as to relieve the possible difficulty of passing over the stumps of the corn. It is practicable to dispense with the smaller frame and the wheel *e* by extending the axle or shaft C, so as to serve for an axle for the main drive-wheel, and enlarging the wheel D. The axle which supports the main drive-wheel may be entirely dispensed with and the shaft or axle used to perform its functions, as shown. An inclined cover for the knife-box may also be used to facilitate the passage of the corn when cut to the revolving tables. The knives, too, may be constructed with any number of blades, as may be desired, and may be used in any number, at pleasure. A tongue or shaft may be attached in any suitable manner. A seat for a driver may be conveniently placed to the left of the reel above the main drive-wheel.

What I claim as my invention, and desire to secure by Letters Patent, is—

1. The compound lever R, as described and shown, consisting of the bar *r'* and the slides *r r* provided with the pins *s s*, in combination with the springs *o o* and wheels *n n*, for the purposes set forth.

2. The wheels *n n* upon the shafts of the revolving tables, constructed as described, with the notches *t t* in their collars, in combination with the pins *u u* upon the frame I and springs *o o*, for the uses and purposes shown and described.

In testimony that I claim the foregoing improvement in corn-harvesters, as above described, I have hereunto set my hand and seal this 1st day of August, 1871.

ALBERT F. ROBERTS. [L. S.]

Witnesses:
 EDM. F. BROWN,
 JOHN C. COX.

(47.)